United States Patent [19]

Sekiya

[11] Patent Number: 4,822,860
[45] Date of Patent: Apr. 18, 1989

[54] FLUORINE-CONTAINING POLYMERIC AMINE-AMIDE COMPOUND AND A METHOD FOR THE PREPARATION THEREOF

[75] Inventor: Akira Sekiya, Tsukuba, Japan

[73] Assignee: Director General of Agency of Industrial Science & Technology, Tokyo, Japan

[21] Appl. No.: 138,350

[22] Filed: Dec. 28, 1987

[30] Foreign Application Priority Data

Jan. 7, 1987 [JP] Japan .................................. 62-1350

[51] Int. Cl.$^4$ ............................................. C08F 26/02
[52] U.S. Cl. ................................. 525/328.2; 525/386; 528/271
[58] Field of Search ............................ 525/328.2, 386; 528/271

[56] References Cited

U.S. PATENT DOCUMENTS 4,606,973 8/1986 Schmidt et al. ................. 525/328.2

Primary Examiner—Harold D. Anderson
Attorney, Agent, or Firm—Wyatt, Gerber, Burke and Badie

[57] ABSTRACT

When a poly(allyl amine) is reacted with a perfluoroalkanoic acid ester of the formula $R_f$—CO—OR, in which $R_f$ is a perfluoroalkyl group having 6 to 15 carbon atoms and R is an alkyl group having 1 to 5 carbon atoms, e.g., ethyl perfluorooctanoate, the amino groups in the poly(allyl amine) are almost quantitatively amidated to introduce the perfluoroalkyl groups into the polymer as bonded through amide linkages. When the degree of amidation of the amino groups is 40% or smaller, the fluorine-containing polymeric compound is soluble in organic solvent to give a solution, from which Langmuir-Blodgett's films, i.e. monomolecular and built-up film, can be readily prepared.

4 Claims, 1 Drawing Sheet

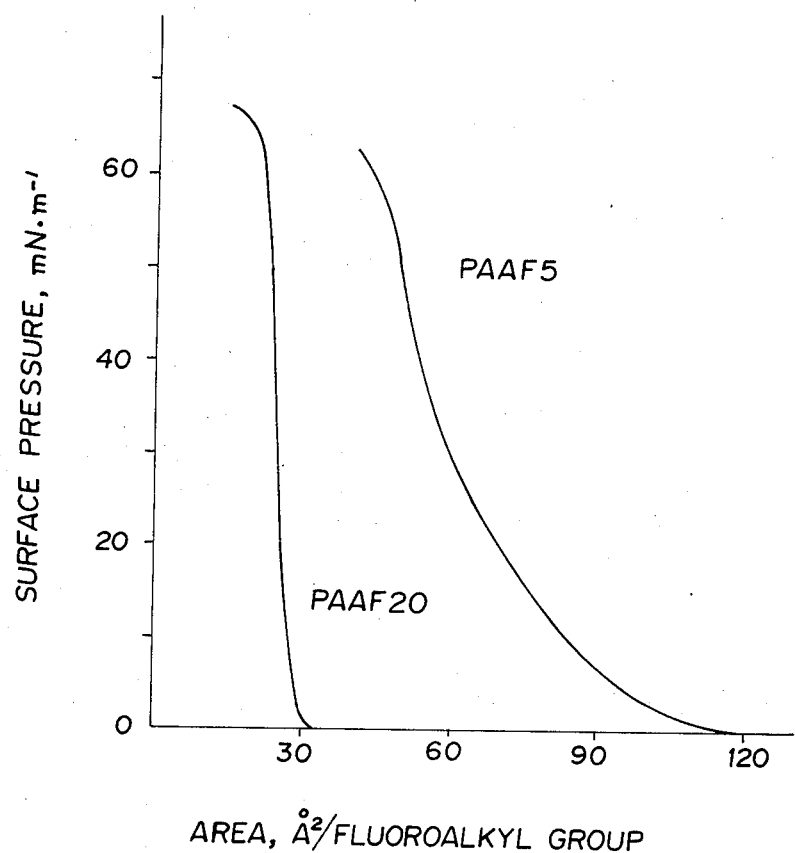

FLUORINE-CONTAINING POLYMERIC AMINE-AMIDE COMPOUND AND A METHOD FOR THE PREPARATION THEREOF

BACKGROUND OF THE INVENTION

The present invention relates to a novel fluorine-containing polymeric compound which is useful as a material of Langmuir-Blodgett's films as well as to a method for the preparation of such a fluorine-containing polymeric compound.

It is known that polymeric compounds modified with long-chain perfluoroalkyl groups have excellent properties such as water- and oil-repellency, insusceptibility to dust deposition, corrosion resistance and the like so thaat they are used, for example, for protection and surface modification of electronic curcuit boards.

A problem in the use of such a polymeric compound having perfluoroalkyl groups introduced into the molecular structure is that the polymer is hardly soluble in solvents due to the water- and oil-repellency inherent in the perfluoroalkyl groups so that fluorine-containing polymers are generally not handleable as a material of thin films. In other words, fluorine-containing polymeric compounds can be shaped only with great difficulties into an extermely thin film as an essential element when the polymer is used as a material for surface modification or protection of boards. While it is important that the perfluoroalkyl groups as the functional groups for the oil- and water-repellency and other useful surface properties are oriented toward the surface of the polymeric material in order that the desired performance can be fully exhibited, a general understanding is that such an orientation of polymeric molecules is far from possibility.

Preparation of a thin film or so-called Langmuir-Blodgett's film of a fluorine-containing polymeric material is reported, for example, by R. Elbert, et al. in Journal of the American Chemical Soceity, volume 106, page 7678 (1984), according to which a fluorine-containing ethylenically unsaturated monomeric compound is spread over the surface of water to form a monomolecular film followed by the photopolymerization of the monomer by the irradiation with ultraviolet light. This method is, however, defective in respect of the uncontrollability of the density of the fluorine-containing molecular chain in the monomolecular film and indefiniteness of the degree of polymerization after the photopolymerization.

SUMMARY OF THE INVENTION

The inventor accordingly has continued extensive investigations to develop a method for the preparation of an extremely thin film of a fluorine-containing polymeric compound by utilizing the water-repellency of the perfluoroalkyl groups and, as a result, arrived at a discovery that a fluorine-containing polymeric compound quite satisfactory as a material of extremely thin films in respect of the intramolecular and intermolecular orientation can be obtained when a part or all of the amino groups in a poly(allyl amine) are converted into perfluoroalkyl-containing pendant groups each bonded through an amide linkage.

Thus, the present invention completed on the basis of the above mentioned discovery provides a fluorine-containing polymeric compound which is a novel compound represented by the general formula $$-CH_2-CH(CH_2-NH_2)]_{m-n}[CH_2-CH(CH_2-NH-CO-R_f)]_n, \quad (I)$$

in which $R_f$ is a perfluoroalkyl group having 6 to 15 carbon atoms, m is a positive integer in the range from 10 to 1500 and n is a positive integer not exceeding m.

According to the invention, the above defined fluorine-containing polymeric compound can be prepared by the amidation reaction of a poly(allyl amine) of the formula $$-CH_2-CH(CH_2-NH_2)]_m, \quad (II)$$

in which m has the same meaning as defined above, with a perfluoroalkanoic acid ester of the general formula $$R_f-CO-OR, \quad (III)$$

in which $R_f$ has the same meaning as defined above and R is an alkyl group having 1 to 5 carbon atoms.

According to the invention, the above defined fluorine-containing polymeric compound has good solubility in organic solvents to give a solution, from which a Langmuir-Blodgett's film, referred to as a LB film hereinbelow, can be readily prepared when the subscript n in the above given general formula (I) is not larger than 0.4 m.

BRIEF DESCRIPTION OF THE DRAWING

The figure illustrates the F-A curves of the inventive fluorine-containing polymeric compounds prepared in Examples.

DETAILED DESCRIPTION OF THE PREFERRED EMBODIMENTS

As is described above, the fluorine-containing polymeric compounds, i.e. polymers of the invention represented by the general formula (I) can be obtained by the amidation reaction between a poly(allyl amine) of the general formula (II) and a perfluoroalkanoic acid ester of the general formula (III) according to the reaction equation (general formula II)+n(general formula III)

→(general formula I)+nROH.

The amidation reaction of this equation is performed usually in an alcohol such as methyl alcohol as the solvent by keeping the reaction mixture at a temperature in the range from $-10°$ C. to $+50°$ C. or, preferably, from $+15°$ C. to $+30°$ C. Suitable alcohols as the solvent for the reaction include methyl, ethyl, n-propyl, isopropyl, n-butyl, sec-butyl, isobutyl, tert-butyl and n-amyl alcohols, of which methyl alcohol is preferred.

The poly(allyl amine) as the starting material of the amidation reaction can be obtained by neutralizing a poly(allyl amine) hydrochloride with a basic compound. In a preferable embodiment of the inventive method, the perfluoroalkanoic acid ester or alkyl perfluoroalkanoate of the general formuma (III) is added to an alcoholic solution of the poly(allyl amine) which is obtained by dissolving a poly(allyl amine) in an alcohol such as methyl alcohol or, alternatively, by neutralizing a poly(allyl amine) hydrochloride in an alcoholic solution of an alkali such as a methyl alcohol solution of sodium methylate followed by removal of the solid matter. The amidation reaction proceeds almost quantitatively so that the degree of amidation or the value of the subscript n relative to m in the general formula (I) can be easily controlled by using the alkyl perfluoroalkanoate in a calculated molar amount relative to the amino groups in the poly(allyl amine).

The amidation reaction proceeds throughout in a homogeneous reaction system at least when the degree of amidation is sufficiently low by using a limited molar amount of the alkyl perfluoroalkanoate relative to the poly(allyl amine). When a large amount of the alkyl perfluoroalkanoate is used relative to the poly(allyl amine), precipitates are formed in the reaction mixture as the amidation reaction proceeds as a result of formation of highly amidated polymeric molecules less soluble in the solvent. The amidation reaction, which is performed under agitation of the reaction mixture, is usually complete at room temperature within several minutes when the desired degree of amidation is low while the reaction takes about 24 hours when a highly amidated polymeric compound is to be obtained. After completion of the reaction, the reaction product of the amidated poly(allyl amine) can be separated from the reaction mixture according to a known procedure including the steps of, for example, evaporation of the solvent from the polymer solution, filtration, washing with water, drying and the like. A monomolecular film of the polymer can be prepared from a solution of the polymer in a conventional procedure including the steps of spreading of the solution over the surface of water, evaporation of the solvent and gathering of the polymer molecules into a monomolecular layer under a surface pressure of, for example, 20 mN·m$^{-1}$. The thus obtained product can be identified to be the fluorine-containing amidated poly(allyl amine) of the general formula (I) by the infrared absorption spectrophotometric analysis and elementary analysis for the content of fluorine.

The inventive fluorine-containing polymeric compound is soluble in organic solvents and the solution can readily spread over the surface of water to form a monomolecular film by accumulation of the polymer under an appropriate surface pressure after evaporation of the solvent, from which a built-up LB film or a so-called Y-type LB film can be prepared. The thus obtained extremely thin films were examined to determine the film thickness and critical surface tension $Y_c$ against a n-alkane leading to the following results. Thus, a polymeric compound of low degree of amidation or low content of the perfluoroalkyl groups has a small film thickness of about 20 Å with $Y_c$ close to the value of 18.5 dyn/cm for a poly(tetrafluoroethyl) while the film thickness increases up to about 30 Å with a value of $Y_c$ smaller than 18.5 dyn/cm when the degree of amidation or content of the perfluoroalkyl groups in the polymeric compound is increased indicating that the $CF_3$ groups are aligned on the surface of the film. Analysis of the limiting areas given by the F-A curves of LB films indicates that the area occupied by a single perfluoroalkyl group is 29 Å$^2$ corresponding to the cross sectional area of the —$CF_2$— polymeric chain when the content of the perfluoroalkyl groups introduced into the polymer molecules is sufficiently large indicating that the molecules stands upright in a side-by-side disposition on the surface of water, the area being increased when the content of the perfluoroalkyl groups is decreased indicating that the molecules take a more or less inclined or laid-down disposition. Thin films of the polymeric compounds can also be prepared by casting a solution of the polymer over a flat substrate surface followed by evaporation of the solvent. The small value of $\gamma_c$ on such a film prepared by casting of a solution indicates that the terminal $CF_3$ groups are protruded on the surface of the film. This fact is suggestive of the possibility that the arrangement and disposition of the perfluoroalkyl groups on the film surface can be controlled by preparing the film in different film-forming methods. For example, the perfluoroalkyl groups can taken an upright disposition or laid-down disposition or can be arranged in a dense distribution or in a sparse distribution on the film surface depending on the film-forming method.

Although the inventive fluorine-containing polymeric compounds are insoluble in solvents when the content of the perfluoroalkyl groups therein is high, even such a polymeric compound can be shaped into a film by plastic deformation since the polymer is softened by heating. The film of the inventive polymeric compound prepared by plastic deformation is also highly water-repellent by virtue of the perfluoroalkyl groups.

As is indicated above in detail, the present invention provides a novel fluorine-containing polymer which can be synthesized in a high yield by the amidation reaction to almost quantitatively introduce perfluoroalkyl groups into a poly(allyl amine) to form amide linkages. Further, the amount of the perfluoroalkyl groups introduced into the poly(allyl amine) can be freely controlled. The thus synthesized fluorine-containing polymeric compounds of the invention can be used for the preparation of a LB film having a possible application as a surface-modifying material or an extremely thin film not known in the prior art. In films of the inventive fluorine-containing polymeric compounds, the intramolecular and intermolecular orientation of the perfluoroalkyl groups as the functional groups is controllable on the film surface while no prior art is known for controlling the intramolecular and intermolecular orientation of perfluoroalkyl groups in a polymeric compound by the Langmuir-Blogett's method.

The inventive fluorine-containing polymeric compounds should have a value of the subscript n in the general formula (I) not larger than 0.4 m when a polymeric compound is used satisfactorily as a material of LB films. The LB films implied in this invention include monomolecular films and built-up films prepared by the well known Langmuir-Blodgett's method.

In the following, the present invention is described in more detail by way of examples.

EXAMPLE 1

A method alcohol solution of sodium methylate was prepared by adding 0.23 g of metallic sodium to 15 ml of methyl alcohol and, when evolution of hydrogen gas from the solution had ceased, 0.936 g of a poly(allyl amine) hydrochloride having an average molecular weight of about 9000 was added to the solution and agitated in a covered reaction vessel. The precipitates of sodium chloride separated from the reaction mixture by filtration were washed with 10 ml of methyl alcohol and the washing was combined with the filtrate. Thereafter, the thus obtained solution was admixed at one time with 0.8 g of ethyl perfluorooctanoate dissolved in 5 ml of methyl alcohol. The reaction mixture was a clear solution of the amidated poly(allyl amine) having perfluoroheptyl groups introduced thereinto and could be used as such in the preparation of films.

The polymer solution prepared in the above described manner was then freed from the solvent to dryness by evaporation under reduced pressure and the solid residue was washed with water and dried to give a polymeric compound having perfluoroheptyl groups bonded to the polymeric structure through amide linkages and containing 41.5% by weight of fluorine in good coincidence with the theoretical fluorine content of 41.8% by weight. This fluorine content corresponded to a degree of amidation of 20% or, namely, 20% of the amino groups substituted by the perfluoroheptyl groups bonded through the amide linkages. The infrared absorption spectrum of the polymeric compound had strong absorption bands at wave numbers of 1708 cm$^{-1}$ and 1555 cm$^{-1}$ assignable to the carbon-fluorine bonds supporting the above mentioned amidated structure of the polymeric compound.

In a similar manner to the above, fluorine-containing polymeric compounds of different degrees of amidation were prepared from the same poly(allyl amine) and ethyl perfluorooctanoate or ethyl perfluorononanoate. The amount of metallic sodium was increased to 1.1 times of the above given amount when the intended degree of amidation was 80% or larger. Following is a summary of the results of the analysis for the fluorine content in the thus prepared fluorine-containing polymeric compounds given in the order of % degree of amidation, % by weight of the fluorine content is found and, in the brackets, % by weight of the theoretical fluorine content.

From ethyl perfluorooctanoate: (1) 100%, 62.9% (62.9%); (2) 80%, 61.0% (60.5%); (3) 60%, 57.5% (58.0%); (4) 40%, 52.5;1 % (52.9%); (5) 20%, 41.5% (41.8%); and (6) 5%, 18.0% (18.5%)

From ethyl perfluorononanoate: (1) 80%, 62.3;1 % (62.4%); (2) 67%, 61.8% (61.7%); and (3) 40%, 54.4% (54.9%)

EXAMPLE 2

The figure in the accompanying drawing illustrates the so-called F-A curves for the relationship of the surface pressure vs. the area occupied by a single molecule obtained by the Langmuir-Blodgett's method in which a diluted solution of the fluorine-containing polymeric compound in a solvent mixture of methyl alcohol and banzene was spread over the surface of water at 17° C. The curves in the figure indicated by PAAF5 and PAAF20 were obtained by using the poly(allyl amine) amidated with ethyl perfluorooctanoate in a degree of amidation of 5% to 20%, respectively. Calculation from these curves indicated that the cross sectional area per molecule in the film or the so-called limiting area was 29 Å$^2$ in PAAF20 and 70 Å$^2$ in PAAF5 per fluoroalkyl group.

EXAMPLE 3

The fluorine-containing polymeric compounds of PAAF5 and PAAF20 used in Example 2 were each spread over the surface of water at 17° C. in the same manner as in Example 2 and the monomolecular layer accumulated under a surface pressure of 20 mN·m$^{-1}$ on the surface of water was transferred and taken up on a glass plate in the form of a monomolecular film or built-up film. The built-up film was a Y film with up to 7 layers of accumulation.

The polymer solution after the amidation reaction in Example 1 was diluted by 3 times with methyl alcohol and the diluted solution was cast on a glass plate followed by evaporation of the solvent to give a thin film of the polymeric compound. Further, a transparent polymer film could be prepared by compression molding of fluorine-containing polymeric compound prepared in Example 1 by the amidation reaction of the poly(allyl amine) with ethyl perfluorononanoate in a degree of amidation of 80% at the softening point of the polymeric compound.

EXAMPLE 4

The 7-layered built-up LB film prepared in Example 3 was subjected to the determination of the surface roughness and film thickness by using Talystep (an instrument manufactured by Rank Taylor Hobson Co.) to find that the thickness per layer was 22 Å in PAAF5 and 29 Å in PAAF20 and the surface roughness was about 2 to 4 Å as given by the height difference between the highest adn lowest levels.

EXAMPLE 5

The LB films of the fluorine-containing polymeric compound PAAF20 and PAAF5 prepared in Example 3 were subjected to the measurement of the contact angle with a series of n-alkanes including n-octane through n-hexadecane excepting n-nonane and the values of critical surface tension $Y_c$ were obtained from the Zisman plot to give the results of 16.4, 16.2 and 18.6 dyn/cm for the monomolecular film of PAAF20, 7-layered built-up film of PAAF20 and 7-layered built-up film of PAAF5, respectively. Values of $Y_c$ of 14.4 and 20.1 dyn/cm were obtained for the films prepared by casting of the solutions of PAAF20 and PAAF5, respectively. The contact angles of water to the films were: 74°; 106°; 110°; 107°; 115°; 83°; and 114° for a film of the poly(allyl amine); the molecular film of PAAF20; the 7-layered built-up film of PAAF20; the 7-layered built-up film of PAAF5; the film of PAAF20 prepared by casting of the polymer solution; the film of PAAF5 prepared by casting of the polymer solution; and the compression-molded film of the fluorine-containing polymeric compound amidated with ethyl perfluorononanoate in a degree of amidation of 80% prepared in Example 3, respectively.

What is claimed is:

1. A fluorine-containing polymers having recurring units represented by the general formula

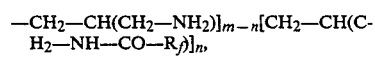
—CH$_2$—CH(CH$_2$—NH$_2$)]$_{m-n}$[CH$_2$—CH(CH$_2$—NH—CO—R$_f$)]$_n$, in which R$_f$ is a perfluoroalkyl group having 6 to 15 carbon atoms, m is a positive integer in the range from 10 to 1500 and n is a positive integer not exceeding m.

2. A method for the preparation of a fluorine-containing polymers having recurring units represented by the general formula

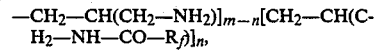
—CH$_2$—CH(CH$_2$—NH$_2$)]$_{m-n}$[CH$_2$—CH(CH$_2$—NH—CO—R$_f$)]$_n$, in which R$_f$ is a perfluoroalkyl group having 6 to 15 carbon atoms, m is a positive integer in the range from 10 to 1500 and n is a positive integer not exceeding m, which comprises reacting a poly(allyl amine) having recurring units of the formula

—CH$_2$—CH(CH$_2$—NH$_2$)]$_m$, in which m has the same meaning as defined above, with a perfluoroalkanoic acid ester represented by the general formula $$R_f—CO—OR,$$

in which $R_f$ has the same meaning as defined above and R is an alkyl group having 1 to 5 carbon atoms, in an amount of n moles per mole of the poly(allyl amine).

3. The method as claimed in claim 2 wherein the perfluoroalkanoic acid ester is ethyl perfluorooctanoate or ethyl perfluorononanoate.

4. A Langmuir-Blodgett's film of a fluorine-containing polymers having recurring units represented by the general formula $$—CH_2—CH(CH_2—NH_2)]_{m-n'}[CH_2—CH(CH_2—NH—CO—R_f)]_{n'},$$

in which $R_f$ is a perfluoroalkyl group having 6 to 15 carbon atoms, m is a positive integer in the range from 10 to 1500 and n' is a positive integer not exceeding 0.4 m.

* * * * *